Patented Mar. 26, 1929.

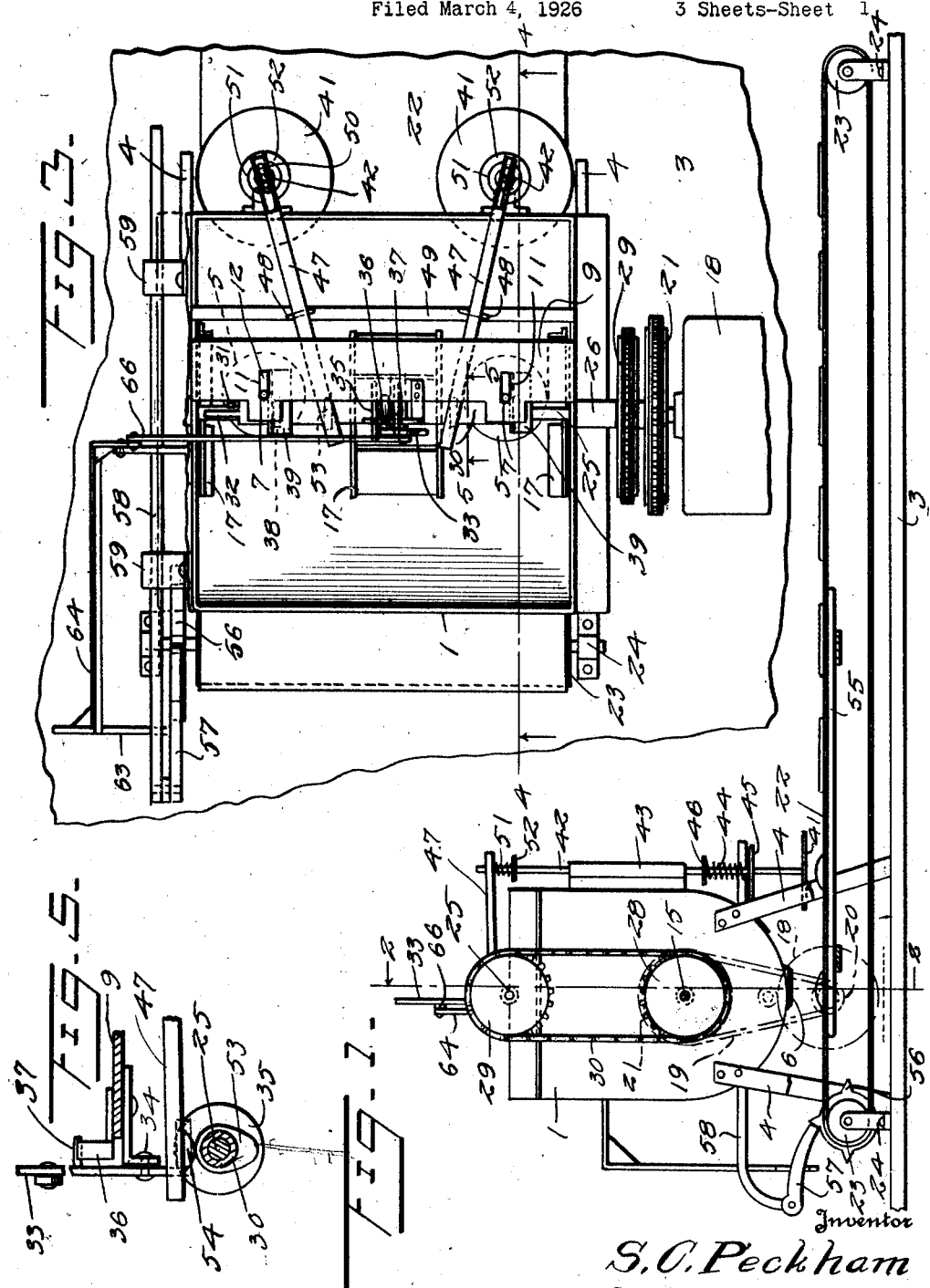

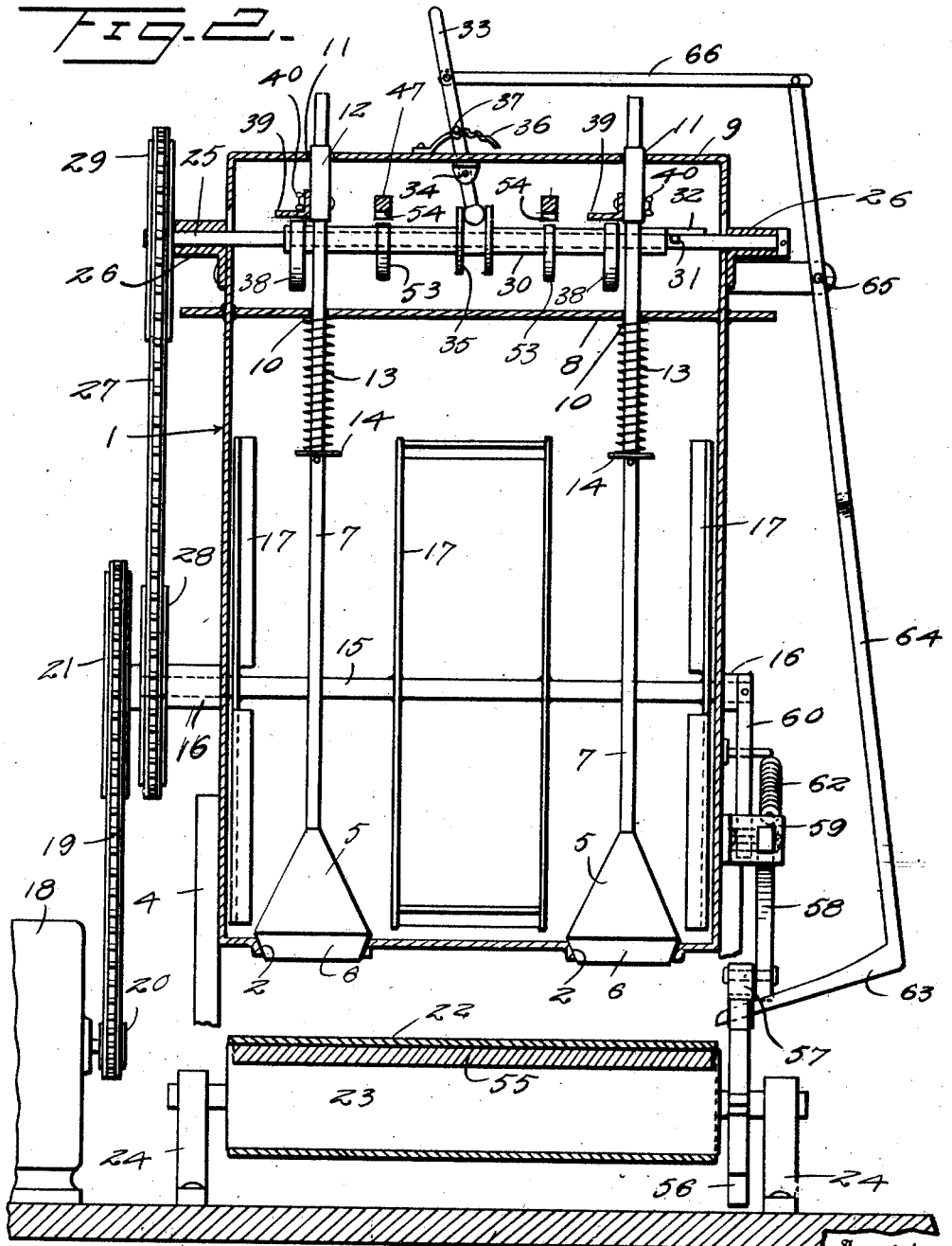

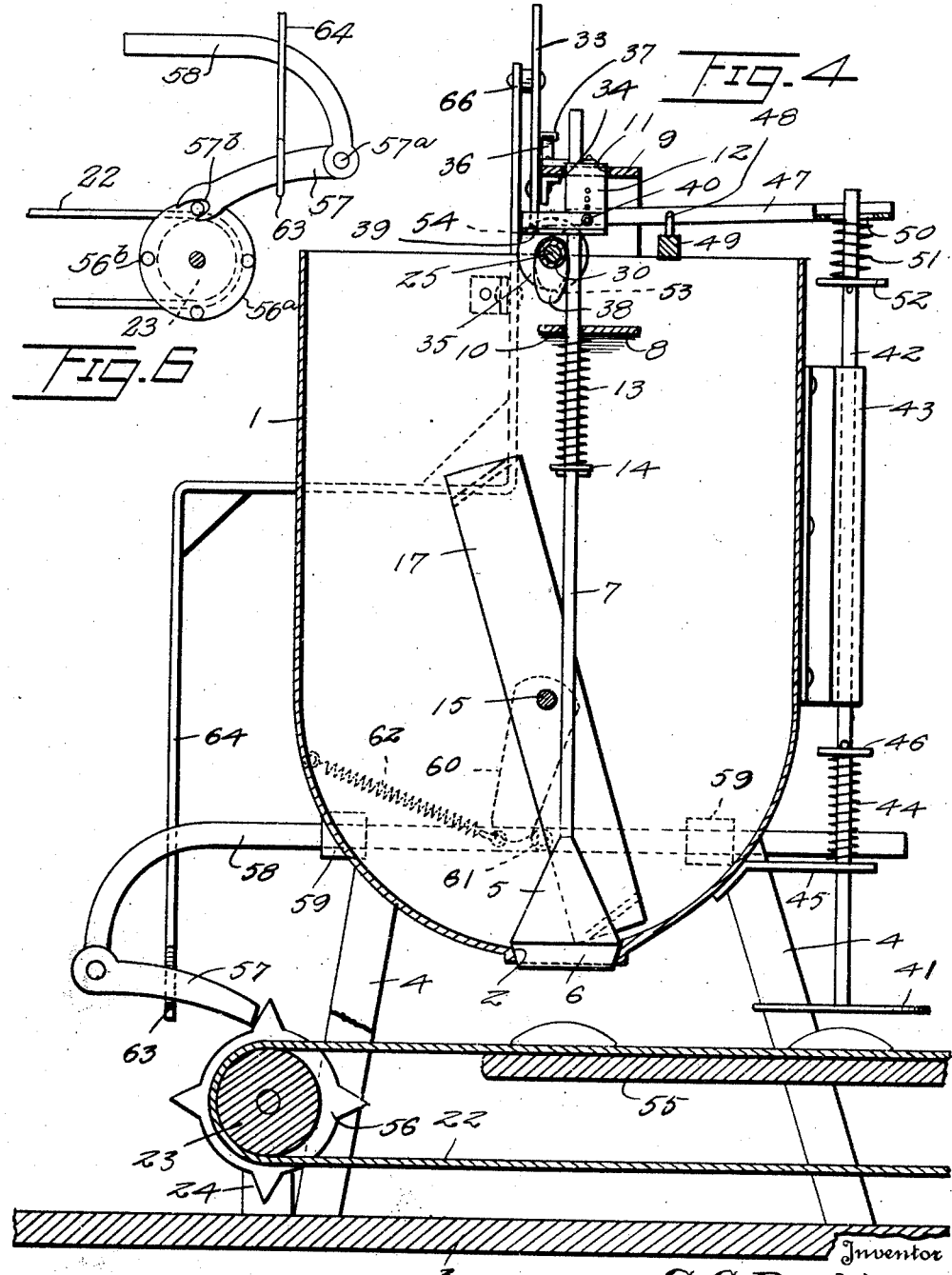

1,707,066

UNITED STATES PATENT OFFICE.

SAMUEL C. PECKHAM, OF GREENVILLE, TEXAS.

CANDY-MAKING MACHINE.

Application filed March 4, 1926. Serial No. 92,231.

This invention relates to candy making machines, and has for one of its objects the provision of a novel machine of this character which shall be adapted to first mix the materials from which the candy is to be made, then form batches of the mixed materials, and thence form the batches into the desired shape.

With the foregoing and other objects in view, the nature of which will be readily understood as the description proceeds, the invention consists of the construction, combination and arrangement of parts hereinafter fully described and claimed, and illustrated in the accompanying drawings, wherein:

Figure 1 is a view in side elevation of a candy making machine involving my invention, Figure 2 is a sectional view taken on the vertical plane indicated by the line 2—2 of Figure 1, Figure 3 is a top plan view of the machine, Figure 4 is a sectional view taken on the vertical plane indicated by the line 4—4 of Figure 3, Figure 5 is a similar view taken on the vertical plane indicated by the line 5—5 of Figure 3, and Figure 6 is a modified form of the pawl and ratchet wheel shown in Figure 1.

Corresponding and like parts are referred to in the following description, and designated in the several views of the accompanying drawings, by similar reference characters.

The machine comprises a receptacle 1 the bottom wall of which is of arcuate formation and provided with discharge openings 2. The receptacle 1 is supported upon and above a table or bench 3 by legs 4. The openings 2 are of conical formation and are normally closed by plungers 5. These parts are conical and have inverted conical lower end portions 6 which fit in the openings 2. Rods 7 which extend upwardly from the plungers 5, are slidably mounted in guide strips 8 and 9 secured to the receptacle 1 and provided with circular and polygonal openings 10 and 11, respectively, for the reception of the rods. Polygonal portions 12 of the rods 7 pass through the openings 11 and hold the rods against rotary movement. Compression springs 13 normally hold the plungers 5 in their lowered or closed position, and are mounted on the rods 7 between the guide strip 8 and seats 14 secured to the rods. A shaft 15 extends through the receptacle 1 and is journaled in bearings 16, and mixing blades 17 are secured to and extend in opposite directions from the shaft. The blades 17 are adapted to be operated to effect the mixing of the material from which the candy is to be made by means of an electric or other suitable motor 18 which is connected to the shaft 15 preferably by a sprocket chain 19 passing about a sprocket wheel 20 fixed to the armature shaft of the motor 18 and a sprocket wheel 21 fixed to the shaft 15.

An endless conveyor 22 is mounted upon the bench or table 3 with its rear end disposed directly beneath the discharge openings 2 of the receptacle 1. The conveyor 22 is supported on rollers 23 which are journaled in brackets 24 secured to the bench or table 1, and is provided for the purpose of receiving the batches of the mixed material as they are discharged from the receptacle 1 through the openings 2. The plungers 5 are first lifted by means hereinafter described and thence forced downwardly by the action of the springs 13 to form the batches. A shaft 25 extends across the receptacle 1 and is journaled in bearings 26. This shaft is driven from the shaft 15 by a sprocket chain 27 passing about sprocket wheels 28 and 29 fixed to the shafts respectively. A sleeve 30 is loosely mounted on the shaft 25, and these parts are provided with pins 31 and 32, respectively, to permit them to be connected together so as to effect the rotation of the sleeve from the shaft. The sleeve 30 may be moved in an endwise direction to engage the pin 32 with or disengage it from the pin 31 by means of a lever 33 which is pivoted as at 34 on the guide strip 9 and has one end fitting in a grooved collar 35 fixed to the sleeve. A notched spring 36 mounted upon the guide strip 9 and a pin 37 carried by the lever 33 provide means for securing the sleeve 30 against casual endwise movement with respect to the shaft 25. Cams or wipers 38 are secured to the sleeve 30 and cooperate with flanges or toes 39 adjustably secured to the rods 7 whereby to effect the lifting of the plungers 5 against the tension of the springs 13. The size of the batches depends upon the diameter of the openings 2 and the distance that the plungers 5 are lifted by the cams 38, and the adjustable connection of the flanges 39 with the rods 7 permit the distance that the plungers are raised to be varied so as to effect the formation of batches of the desired size. The flanges 39 are adjustable vertically with respect to the rods 7 and are secured in adjusted position by set screws 40. The sleeve 30 is adapted to occupy one of two positions on the shaft 25 one of which is its active position and the other its inactive or idling position. When the sleeve 30 is in active position the pin 32 engages the pin 31 and the cams 38 are in position for engagement with the flanges 39, while when the sleeve is in inactive position, the pin 32 is out of engagement with the pin 31 and the cams 38 are located laterally beyond the flanges 39. While the materials are being mixed, the sleeve 30 is in idling position, and after the completion of the mixing operation the sleeve is moved into its active position whereby to effect the formation of the batches.

The conveyor 22 is adapted to be intermittently operated, and during each operation thereof it is advanced through a distance sufficient to carry the batches beneath patters 41 which are located at the front side of the receptacle 1. Rods 42, to the lower ends of which the patters 41 are secured, are slidably mounted in sleeves 43 secured to the front side of the receptacle 1. The patters 41 are normally supported in raised position by springs 44 which are mounted on the rods 42 between rests 45 secured to the receptacle 1 and rests 46 secured to the rods. Rocker arms 47 are pivoted intermediate their ends as shown at 48 to a supporting bar 49 positioned upon and secured to the receptacle 1. The front ends of the rocker arms 47 are provided with slots 50 through which the upper ends of the rods 42 pass, and springs 51, which establish a cushioned connection between the rocker arms and rods, are mounted upon the rods between the rocker arms and rests 52 secured to the rods. The rear ends of the rocker arms 47 overlie the shaft 25, and are adapted to be rocked by cams or wipers 53 secured to the sleeve 30 and adapted to engage toes 54 secured to the rocker arms. The operation of the rocker arms 47 by the cams 53 imparts a downward thrust to the patters 41 with the result that the batches are shaped as desired. When the cams 53 pass beyond the toes 54, the springs 44 return the patters 41 to their normally raised position. The upper run of the conveyor 22 is supported against downward movement immediately below the patters 41 by a board 55 supported from the bench or table 3.

The means for intermittently operating the conveyor 22 comprises a ratchet wheel 56 fixed to the rear roller, a pawl 57 pivoted to the rear end of a horizontal rod 58 slidably mounted in bearings 59 secured to the receptacle 1, a cam 60 fixed to the shaft 15 and adapted during each revolution thereof to contact with a roller 61 carried by the rod and thus impart a forward thrust to the rod, and a spring 62 secured to the rod and receptacle. The spring 62 is tensioned during the forward thrust of the rod 58 and imparts a rearward thrust to the rod when the cam 60 moves out of contact with the roller 61. The pawl 57 is of the gravity actuated type and is supported in engagement with the ratchet wheel 56 by a cam 63. A vertical lever 64 is pivoted adjacent its upper end to the receptacle 1 as at 65 and has secured to its lower end the cam 63. A link 66 pivotally connects the upper end of the lever 64 to the lever 33 whereby to permit the cam 63 to be swung in the direction of the pawl 57 when the sleeve 30 is moved to free it from the shaft 25 and to permit the cam 63 to be swung in the opposite direction when the sleeve is moved to connect it with this shaft. When the sleeve 30 is locked to the shaft 25, the cams 38 in contact with the toes 39 and the cams 53 in contact with the toes 54, the cam 63 is in the position shown in Figure 2 and when in this position permits the pawl 57 to engage the ratchet wheel 56. When the sleeve 30 is out of engagement with the shaft 25, the cam 63 occupies a position in which it will support the pawl 57 out of operative position with respect to the ratchet wheel 56.

In practice, the machine is prepared for the mixing of the materials from which the candy is to be made by moving the sleeve 30 into its idling position in order that the plungers 5 may remain closed and the patters 41 remain idle during the mixing operation. After the materials have been mixed, the sleeve 30 is locked to the shaft 25, without stopping the machine, with the result that the plungers 5 and patters 41 will be reciprocated and the mixing blades 17 constantly rotated. During the reciprocation of the plungers 5 batches of the mixed material are forced through the openings 2 onto the conveyor 22. As the conveyor 22 is intermittently operated the batches will be carried to and supported beneath the patters 41 long enough to enable them to impart the desired shape to the batches. Due to the yielding connection between the rods 42 and rocker arms 47, there is no danger of the patters 41 crushing nuts or other similar ingredients of the batches. If it is not desired to change the shape of the batches after they have been deposited on the conveyor 22, the sleeve 30 may be moved far enough to carry the cams 53 out of position for engagement with the toes 54 of the rocker arms 47. The pin 32 and the flanges 39 are long enough to permit of this being done without disengaging the sleeve 30 from the shaft 25 and moving the cams 38 out of the path of the flanges 39, and furthermore the pawl 57 will not be moved out of operative position with respect to the ratchet wheel 56. The gears 28 and 29 are of the same size, and in view thereof the shafts 15 and 25 will be driven at the same speed. If desired, the gear 28 may be made smaller than the gear 29 so that the shaft 15 may be driven faster than the shaft 25, as for instance at a ratio of two to one. When the shaft 15 is driven faster than the shaft 25, the cam 60 will be fixed to the latter.

When the sleeve 30 is in idling position, the plungers 5 rest upon the bottom wall of the receptacle 1 and the springs 44 and 51 are not under tension, with the result that the plungers, together with the rods 7, support the flanges 39 slightly above the cams 38 when said cams are in a vertically depending position, and with the result that the longer forward portions of the rocker arms 47 support the toes 54 slightly above the cams 53 when said cams are in a vertically depending position. It will thus be apparent that the sleeve 30 may be moved from its idling into its active position. The pivot 57$^a$ of the pawl 57 is located above and rearwardly of the ratchet wheel 56 and the cam 63, the lower edge of the pawl is concave and rests upon the cam, and the pawl is comparatively long and of considerable width and travels forwardly and downwardly with respect to the cam and the axis of the ratchet wheel, with the result that there is no possibility of its moving out of engagement with the ratchet wheel and the ratchet wheel is positively moved during each forward movement of the pawl. If desired, the type of ratchet wheel shown in Figure 6 may be used. This ratchet wheel 56$^a$ is provided with laterally directed pins 56$^b$, and when used the free end of the pawl will be provided with a notch 57$^b$ for engagement with the pins.

From the foregoing description, taken in connection with the accompanying drawings, the advantages of the construction and of the method of operation of the machine will be readily apparent to those skilled in the art to which it appertains. While I have described the principle of operation of the invention, together with the device which I now consider to be the best embodiment thereof, I desire to have it understood that the device shown is merely illustrative, and that such changes may be made when desired as are within the scope of the invention as claimed.

What is claimed is:—

1. A candy making machine comprising a receptacle provided with an opening in the bottom thereof, a batch forming plunger closing the opening, a rod connected to the plunger and provided with a flange, mixing blades rotatably supported within the receptacle, a shaft, a sleeve loose on the shaft, means adapted to clutch the sleeve to the shaft, a cam carried by the sleeve for contact with the flange to move the plunger in one direction, means for moving the plunger in the opposite direction, and means for operating the blades and shaft.

2. A candy making machine comprising a receptacle provided with an opening in the bottom thereof, a batch forming plunger closing the opening, a rod connected to the plunger and provided with a flange, a conveyor operating below the opening in the receptacle, means for actuating the conveyor, a patter arranged beyond the receptacle and cooperating with the conveyor, a rod connected to the patter, a rocker arm connected to the last named rod, springs urging the rods in one direction, a shaft, cams on the shaft adapted to engage the flange and rocker arm, and means for operating the shaft.

3. A candy making machine comprising a receptacle provided with an opening in its bottom, a batch forming plunger arranged in alinement with the opening, a rod connected to the plunger and provided with a toe, a shaft, a sleeve provided with a cam and slidably mounted on the shaft to adjust the cam into and out of operative position with respect to the toe, means establishing a driving connection between the sleeve and shaft, the cam being adapted to move the flange in one direction, means adapted to move the flange in the opposite direction, and means for operating the shaft.

4. A candy making machine including a shaping element, a rod to which the element is connected, means slidably supporting the rod, a rocker arm connected to the rod, a shaft, a sleeve provided with a cam and slidably mounted on the shaft to permit the cam to be moved into and out of operative position with respect to the rocker arm, the cam being adapted to move the rocker arm and rod in one direction, means for moving the rod and rocker arm in the opposite direction, means establishing a driving connection between the shaft and sleeve, and means for operating the shaft.

5. A candy making machine comprising a receptacle having a discharge opening, a shaft, means for operating the shaft, mixing blades carried by the shaft, a conveyor operating below the discharge opening, means for driving the conveyor from the shaft, a second shaft driven from said first shaft, a batch forming plunger within the receptacle, a patter arranged beyond the receptacle and cooperating with the conveyor, means adapted to operate the plunger and patter from the second shaft and movable to render the plunger and patter inoperative, an element for adjusting said means, and means controlled by the element and adapted to render the conveyor driving means inoperative when said first means is in position to render the plunger and patter inoperative.

In testimony whereof I affix my signature.

SAMUEL C. PECKHAM.